(12) United States Patent
Shigeta

(10) Patent No.: US 10,032,249 B2
(45) Date of Patent: Jul. 24, 2018

(54) IMAGE GENERATING APPARATUS, IMAGE GENERATING METHOD, AND COMPUTER PROGRAM

(71) Applicant: Sakai Display Products Corporation, Sakai-shi, Osaka (JP)

(72) Inventor: Mitsuhiro Shigeta, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/312,141

(22) PCT Filed: Sep. 5, 2014

(86) PCT No.: PCT/JP2014/073558
§ 371 (c)(1),
(2) Date: Nov. 17, 2016

(87) PCT Pub. No.: WO2016/035211
PCT Pub. Date: Mar. 10, 2016

(65) Prior Publication Data
US 2017/0132751 A1    May 11, 2017

(51) Int. Cl.
*G06T 3/00* (2006.01)
*G06T 3/40* (2006.01)
(Continued)

(52) U.S. Cl.
CPC ............ *G06T 3/0025* (2013.01); *G06T 3/403* (2013.01); *G06T 3/4007* (2013.01); *G06T 3/60* (2013.01);
(Continued)

(58) Field of Classification Search
CPC .......... H04N 7/181; G06T 2207/10016; G06T 2207/30232; G06T 2207/30256;
(Continued)

(56) References Cited

U.S. PATENT DOCUMENTS 5,987,174 A    11/1999    Nakamura et al.
9,319,667 B2*   4/2016    Lin ...................... H04N 17/002
(Continued)

FOREIGN PATENT DOCUMENTS

CN    1690659 A    11/2005
EP    1596322 A2   11/2005
(Continued)

*Primary Examiner* — Ruiping Li
(74) *Attorney, Agent, or Firm* — Rudy J. Ng; Bret E. Field; Bozicevic, Field & Francis LLP

(57) ABSTRACT

An image generating apparatus includes an acquiring unit configured to acquire a captured image of a road, a region extraction unit configured to extract an image of a trapezoidal region is enclosed by two vanishing lines which are converged to a vanishing point in a depth direction of the captured image and two parallel lines which respectively intersect with the two vanishing lines from the captured image, a transformation unit configured to transform the image of the trapezoidal region into an image of a rectangular region using a geometric transformation model which transforms the trapezoidal region extracted by the region extraction unit into the rectangular region, and a generation unit configured to generate an image for enlarging and displaying a moving body or a structure on the road present at a distant view part of the captured image based on the transformed image having the rectangular region.

8 Claims, 12 Drawing Sheets

(1) EXTRACT TRAPEZOIDAL REGION    (2) DIVIDE TRAPEZOIDAL REGION    (3) TRANSFORM INTO RECTANGULAR REGION    (4) COMBINE RECTANGULAR REGION

(51) Int. Cl.
    *G06T 3/60*      (2006.01)
    *G06T 7/11*      (2017.01)
    *G06T 7/181*     (2017.01)
    *H04N 7/18*      (2006.01)

(52) U.S. Cl.
    CPC ............... *G06T 7/11* (2017.01); *G06T 7/181* (2017.01); *H04N 7/181* (2013.01); *G06T 2207/10016* (2013.01); *G06T 2207/20164* (2013.01); *G06T 2207/30232* (2013.01); *G06T 2207/30256* (2013.01)

(58) Field of Classification Search
    CPC ......... G06T 2207/20164; G06T 3/0025; G06T 3/4007; G06T 3/403; G06T 3/60; G06T 7/11; G06T 7/181
    See application file for complete search history.

(56) References Cited

U.S. PATENT DOCUMENTS

| | | | |
|---|---|---|---|
| 2004/0080449 A1* | 4/2004 | Horibe | G01S 7/4026 |
| | | | 342/70 |
| 2005/0249379 A1 | 11/2005 | Yoshimura | |
| 2010/0104137 A1* | 4/2010 | Zhang | G06K 9/00798 |
| | | | 382/104 |

FOREIGN PATENT DOCUMENTS

| | | |
|---|---|---|
| JP | H08315116 A | 11/1996 |
| JP | H10105690 A | 4/1998 |
| JP | 2001-213587 A | 10/2001 |
| JP | 2002027433 A | 1/2002 |
| JP | 2007200005 A | 8/2007 |
| JP | 2009017026 A | 1/2009 |
| JP | 2009017179 A | 1/2009 |

* cited by examiner

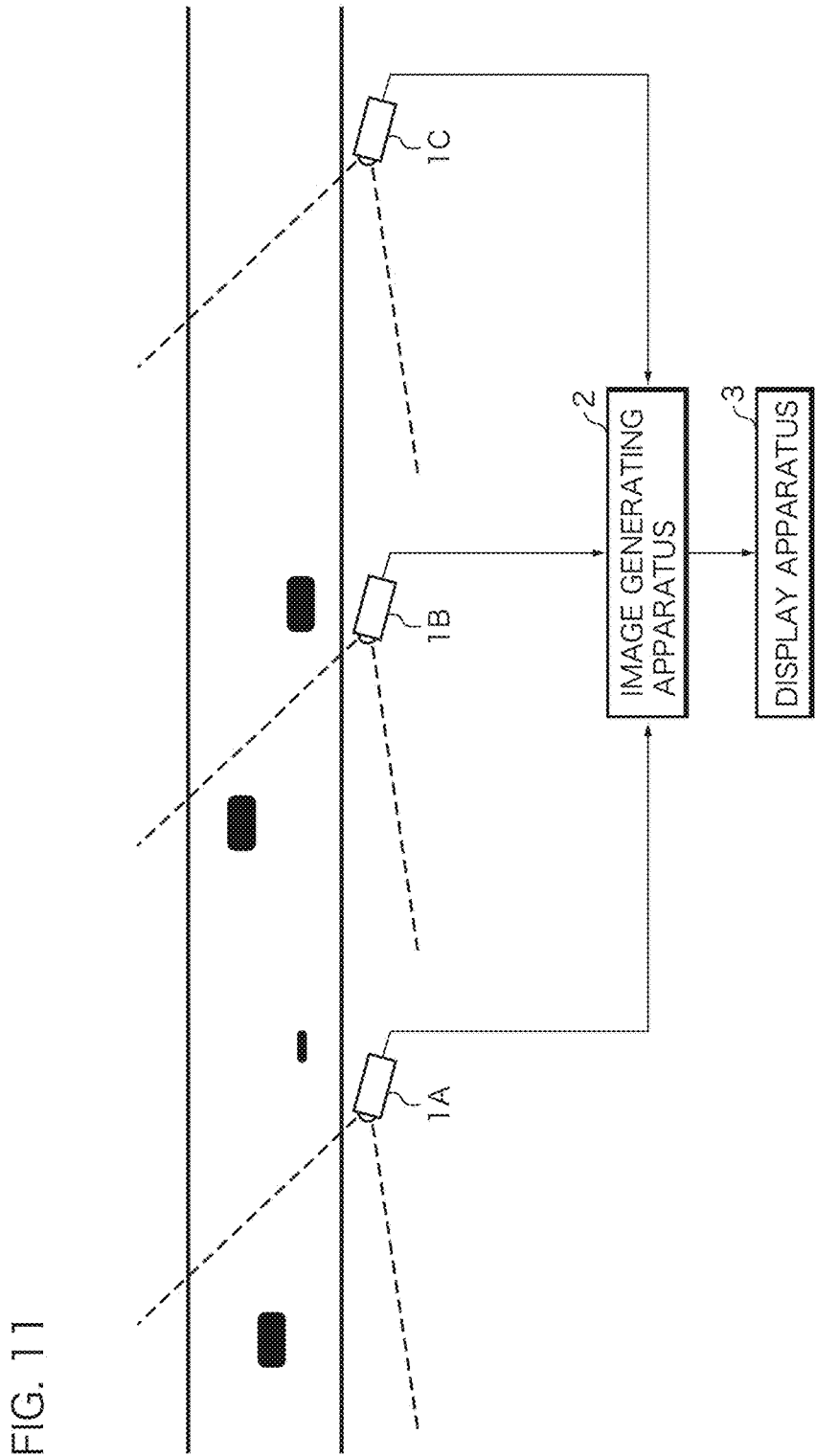

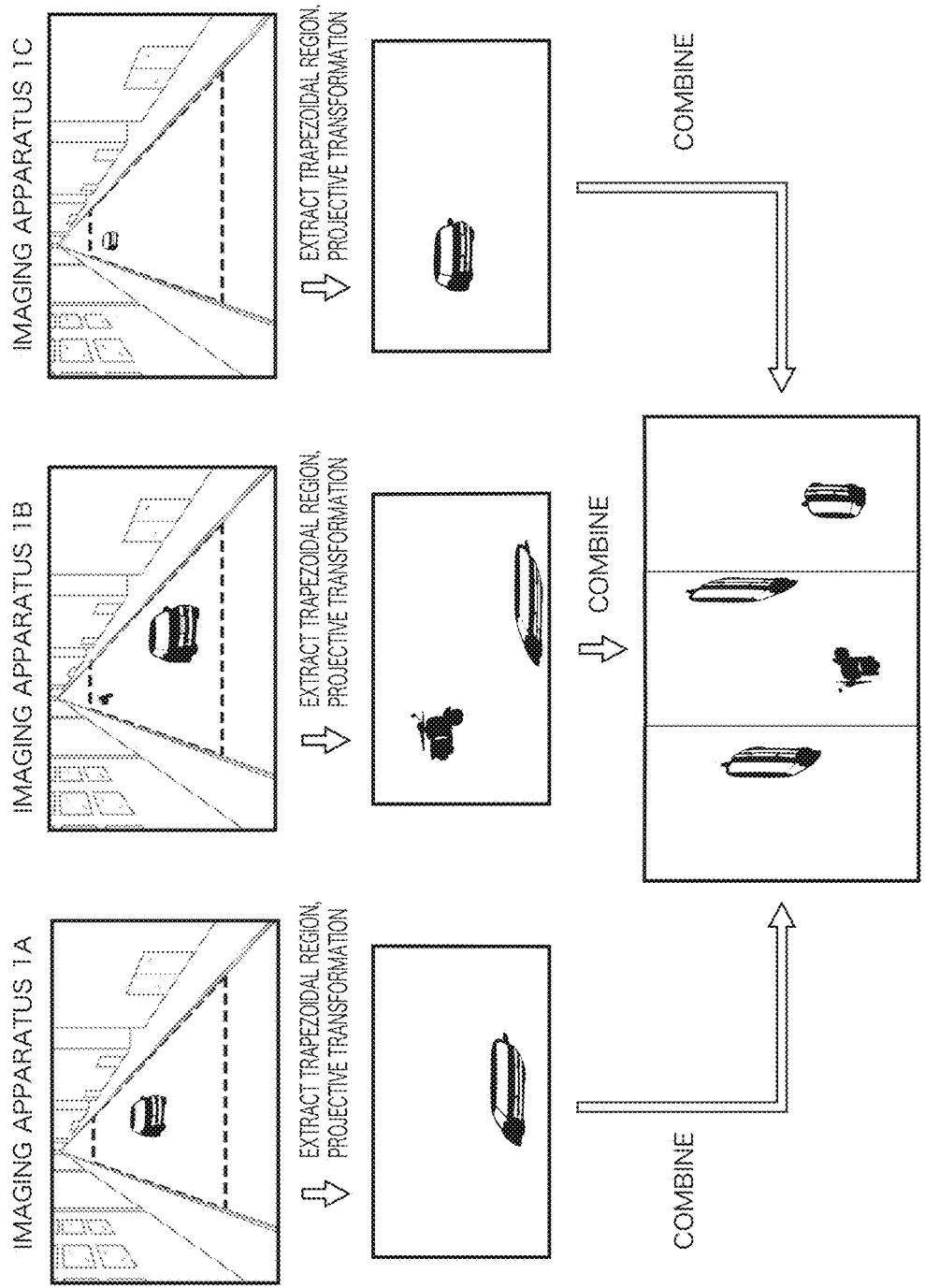

IMAGE GENERATING APPARATUS, IMAGE GENERATING METHOD, AND COMPUTER PROGRAM

CROSS-REFERENCE TO RELATED APPLICATIONS

This application is the national phase of PCT International Application No. PCT/JP2014/073558 which has an International filing date of Sep. 5, 2014 and designated the United States of America.

FIELD

The present invention relates to an image generating apparatus, an image generating method and a computer program which generate an image indicating conditions on a road.

BACKGROUND

In the past, there is a road monitoring system for monitoring events generated on a road by using a plurality of cameras, and performing centralized management of conditions on a road in a control room.

For example, a road monitoring system described in Japanese Patent Laid-open No. 2001-273587 processes images captured by a plurality of monitoring cameras to detect abnormalities such as accidents, and provide information to a driver or a road administrator.

However, the conventional road monitoring system processes images from the monitoring cameras installed at a roadside, above the road, or the like, and therefore may not detect an abnormality at a position that is a dead zone of the monitoring camera or outside a monitoring range of the monitoring camera. Further, in order to remove the dead zone of the monitoring camera, it is necessary to install a larger number of monitoring cameras, and therefore there is a problem in that a large scale of a system is required, and costs are increased.

SUMMARY

In consideration of the above-mentioned circumstances, it is an object of the present invention to provide an image generating apparatus, an image generating method and a computer program capable of providing an image with little dead zone by enlarging images of a moving body and a structure on a road present at a distant view part.

An image generating apparatus according to the present application, which acquires a captured image of a road, and generates an image representing conditions of the road based on the captured image, includes a region extraction means configured to extract an image of a trapezoidal region from the captured image, the trapezoidal region is enclosed by two vanishing lines which are converged to a vanishing point in a depth direction of the captured image and two parallel lines which respectively intersect with the two vanishing lines, a transformation means configured to transform the image of the trapezoidal region into an image of a rectangular region using a geometric transformation model which transforms the trapezoidal region extracted by the region extraction means into the rectangular region, and a generation means configured to generate an image for enlarging and displaying a moving body or a structure on the road present at a distant view part of the captured image based on the transformed image having the rectangular region.

The image generating apparatus according to the present application, wherein the geometric transformation model is represented by projective transformation that defines a geometrical relationship between four vertices of the trapezoidal region and four vertices of the rectangular region.

The image generating apparatus according to the present application, wherein the generation means includes a means configured to rotate the image of the rectangular region.

The image generating apparatus according to the present application, includes a region division means configured to divide the image of the trapezoidal region extracted by the region extraction means in the depth direction; and a means configured to combine a plurality of images of the rectangular region obtained by respectively transforming the images of respective regions divided by the region division means.

The image generating apparatus according to the present application, wherein a plurality of captured images are acquired by imaging different ranges of the road, and the image generating apparatus comprises a means configured to combine the plurality of images of the rectangular region obtained by transforming the images of the trapezoidal regions extracted from the captured images respectively.

The image generating apparatus according to the present application, includes a means configured to acquire information relating to an arrangement of respective imaging apparatuses which take images of the road, and the plurality of images of the rectangular region are combined based on the acquired information relating to the arrangement of the respective imaging apparatuses.

An image generating method according to the present application, which includes acquiring a captured image of a road, and generating an image representing conditions of the road based on the captured image, includes extracting an image of a trapezoidal region from the captured image, the trapezoidal region is enclosed by two vanishing lines which are converged to a vanishing point in a depth direction of the captured image and two parallel lines which respectively intersect with the two vanishing lines, transforming the image of the trapezoidal region into an image of a rectangular region using a geometric transformation model which transforms the trapezoidal region into the rectangular region, and generating an image for enlarging and displaying a moving body or a structure on the road present at a distant view part of the captured image based on the transformed image having the rectangular region.

A computer program according to the present application, which is executed by a computer for generating an image representing conditions on a road based on a captured image of the road, the computer program includes causing the computer to extract an image of a trapezoidal region from the captured image, the trapezoidal region is enclosed by two vanishing lines which are converged to a vanishing point in a depth direction of the captured image and two parallel lines which respectively intersect with the two vanishing lines, and causing the computer to transform the image of the trapezoidal region into an image of a rectangular region using a geometric transformation model which transforms the trapezoidal region into the rectangular region.

According to the present invention, it is possible to generate images for enlarging and displaying of the moving body and the structure on the road present at the distant view part of the captured image to provide the display image with high visibility.

The above and further objects and features of the invention will more fully be apparent from the following detailed description with accompanying drawings.

BRIEF DESCRIPTION OF DRAWINGS

FIG. 11 is a block diagram illustrating a configuration of a road monitoring system according to Embodiment 3.

FIG. 12 is an explanatory diagram describing a processed content performed by an image generating apparatus according to Embodiment 3.

DESCRIPTION OF EMBODIMENTS

Hereinafter, embodiments of the present invention will be described in detail with reference to the accompanying drawings.

Embodiment 1

Figure 1:
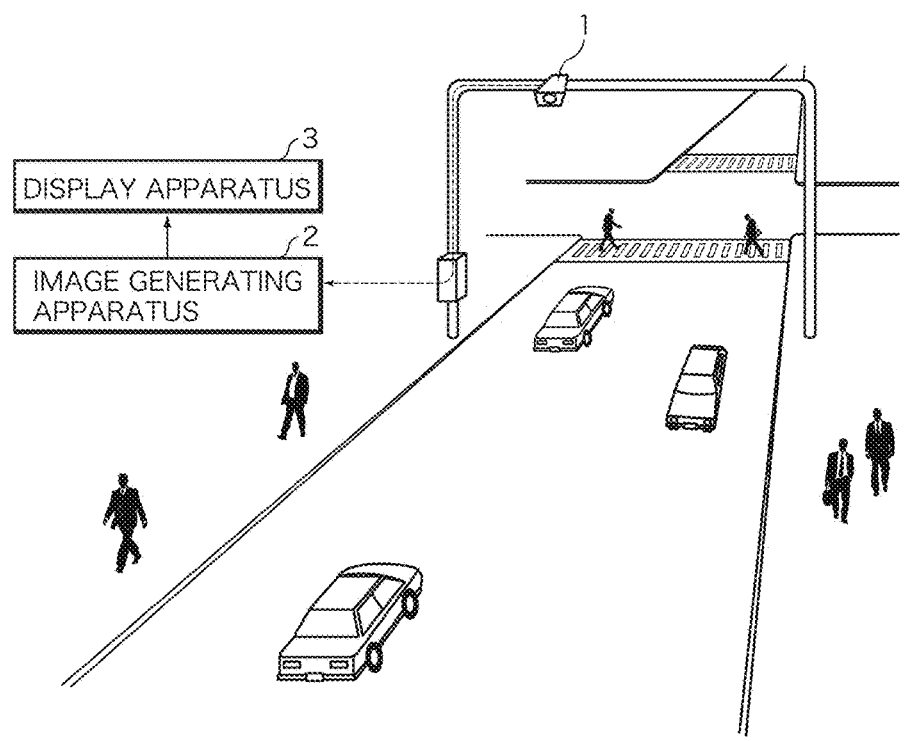
FIG. 1 is a block diagram illustrating a configuration of a road monitoring system according to Embodiment 1.

FIG. 1 is a block diagram illustrating a configuration of a road monitoring system according to Embodiment 1. The road monitoring system according to the present embodiment includes an imaging apparatus 1 which images a road from an oblique above, an image generating apparatus 2 which generates an image representing conditions of a road based on the captured image output from the imaging apparatus 1, and a display apparatus 3 which displays an image output from the image generating apparatus 2.

The imaging apparatus 1 images the road at an appropriate timing. The imaging apparatus 1 is connected to the image generating apparatus 2 through a communication line and transmits the captured image obtained by imaging to the image generating apparatus 2.

The image generating apparatus 2 and the display apparatus 3 are installed in, for example, a monitoring facility in which a person monitoring a road (supervisor) resides, a place where conditions of the road are provided to a road user (user) or the like. The image generating apparatus 2 generates an image displaying the conditions of the road based on the captured image acquired from the imaging apparatus 1. In this case, the image generating apparatus 2 extracts an image of a trapezoidal region to be monitored from the captured image, generates an image enlarged a distant view part by transforming the extracted image of the trapezoidal region into an image of a rectangular region, and generates an output image based on the transformed image of the rectangular region. The image generating apparatus 2 outputs the generated output image to the display apparatus 3.

The display apparatus 3 displays the image output from the image generating apparatus 2 and provides information relating to the conditions of the road to the supervisor and the user.

Hereinafter, an internal configuration of the image generating apparatus 2 will be described.

Figure 2:
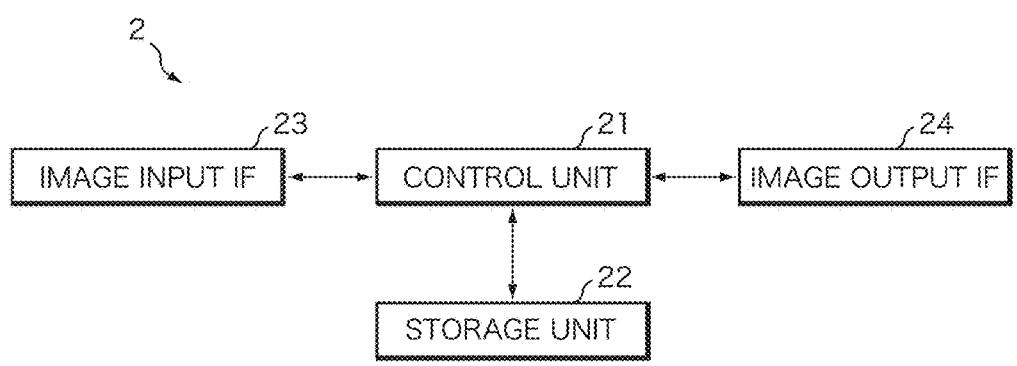
FIG. 2 is a block diagram illustrating a hardware configuration of an image generating apparatus.

FIG. 2 is a block diagram illustrating a hard configuration of the image generating apparatus 2. The image generating apparatus 2 includes a control unit 21, a storage unit 22, an image input IF 23, an image output IF 24 and the like.

The control unit 21 includes, for example, a CPU, a ROM, a RAM and the like. The ROM in the control unit 21 is stored with a computer program for functioning of the entire apparatus as the image generating apparatus according to the present invention. The CPU included in the control unit 21 reads out the computer program stored in the ROM to the RAM, performs the computer program, and controls operations of each part of the above-described hardware to function the entire apparatus as the image generating apparatus according to the present invention. Specifically, the control unit 21 performs processing of extracting the image of the trapezoidal region to be monitored from the captured image acquired by the imaging apparatus 1, processing of transforming the extracted image of the trapezoidal region into the image of the rectangular region, and processing of generating the output image from the transformed image of the rectangular region.

The storage unit 22 includes a non-volatile memory such as an electronically erasable programmable read only memory (EEPROM), a storage apparatus such as a hard disk drive (HDD) or the like. The storage unit 22 stores the captured image acquired through the image input IF 23 as needed, the image being processed or a final output image that is generated by the control unit 21 or the like.

The image input IF 23 is an interface for connecting the imaging apparatus 1 in a wired or wireless manner, and acquires the captured image output from the imaging apparatus 1 by wired communication or wireless communication.

The image output IF 24 is an interface for outputting the output image generated by the control unit 21 to an outside by the wired communication or the wireless communication. An output destination is, for example, the display apparatus 3 that the supervisor and the user peruse. Further, instead of the display apparatus 3, it may be configured to output images representing the conditions of the road to a server apparatus (not illustrated) accumulating the images over time, and it may be configured to transmit the images to apparatuses (for example, car mounted monitors) in vehicles passing near the imaging apparatus 1 by wireless communication. When the output image to be output to the outside is acquired from the control unit 21, the image output IF 24 performs communication processing with an external apparatus based on a communication standard to transmit the output image to the external apparatus.

Figure 3:
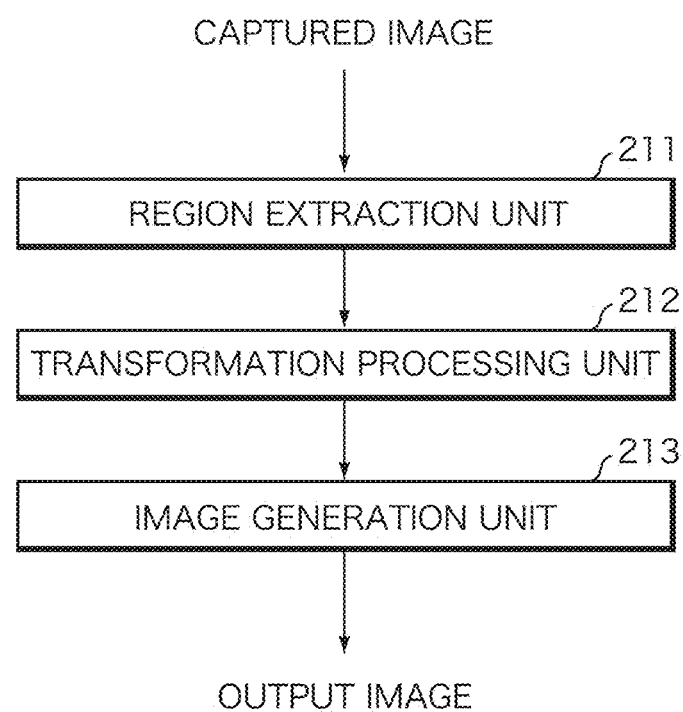
FIG. 3 is a block diagram illustrating a functional configuration of the image generating apparatus.

FIG. 3 is a block diagram illustrating a functional configuration of the image generating apparatus 2. The image generating apparatus 2 includes a region extraction unit 211, a transformation processing unit 212, and an image generation unit 213, as the functional configuration. Each function of the region extraction unit 211, the transformation processing unit 212, and the image generation unit 213 is achieved by allowing the CPU including the control unit 21 to perform the computer program stored in the ROM.

The region extraction unit 211 extracts an image to be processed from the captured image that is inputted through the image input IF 23. More specifically, the region extraction unit 211 extracts the image of the trapezoidal region enclosed by two vanishing lines which are converged to a vanishing point in a depth direction of the captured image, and two parallel lines which respectively intersect with the vanishing lines at a near view part and a distant view part. The region extraction unit 211 transmits the extracted image of the trapezoidal region to the transformation processing unit 212.

The region extraction unit 211 may set the two vanishing lines and parallel lines used to extract the image of the trapezoidal region, each time when the captured image to be processed is input. For example, the region extraction unit 211 may set the two vanishing lines by detecting edges included in the input captured image, searching for a point (the vanishing point) to which extension lines of the detected edges are converged in the depth direction of the captured image, and selecting two edges at an outside of a road portion among the edges converged to the searched vanishing point.

Further, in each of the near view part and the distant view part of the captured image, the region extraction unit 211 sets the parallel lines so as to intersect with the two vanishing lines. Further, positions of the two parallel lines in the captured image may be appropriately set by the region extraction unit 211. For example, the region extraction unit 211 disposes the parallel line on the near view side at a position spaced apart from a lower side of the captured image by as much as a Ya pixel (Ya is about ¼ of a height of the captured image), and disposes the parallel line on the distant view side at a position spaced apart from an upper side thereof by as much as a Yb pixel (Yb is about ¼ of the height of the captured image).

In the present embodiment, the region extraction unit 211 is configured to set two vanishing lines and parallel lines, each time when the captured image is input, but, when a position and a posture of the imaging apparatus 1 is constant at all times, it may be configured to previously set the trapezoidal region to be extracted, and extract the image of the trapezoidal region previously set from each of the captured images. Further, it is not necessary for the vanishing line in the present embodiment to be a precise line as illustrated in a perspective drawing method, but may be a line approximating the vanishing line. Furthermore, it is not necessary for the parallel line in the present embodiment to be exactly parallel to each other, but may be substantially parallel to each other.

The transformation processing unit 212 transforms the image of the trapezoidal region transmitted from the region extraction unit 211 into the image of the rectangular region. More specifically, the transformation processing unit sets a projective transformation matrix that defines a geometrical relationship between four vertices of the trapezoidal region of a transformation source and four vertices of the rectangular region of the transformation destination, and transforms the image of the trapezoidal region into the image of the rectangular region based on the projective transformation matrix. The transformation processing unit 212 transmits the image of the rectangular region to the image generation unit 213 after the transformation.

The image generation unit 213 generates the output image from the image of the rectangular region transformed by the transformation processing unit 212. The image generation unit 213 performs rotation processing, zooming processing, or the like on the image of the rectangular region transmitted from the transformation processing unit 212, thus to generate the output image. The image generation unit 213 outputs the generated output image to the image output IF 24.

Hereinafter, an operation of the image generating apparatus 2 will be described.

Figure 4:
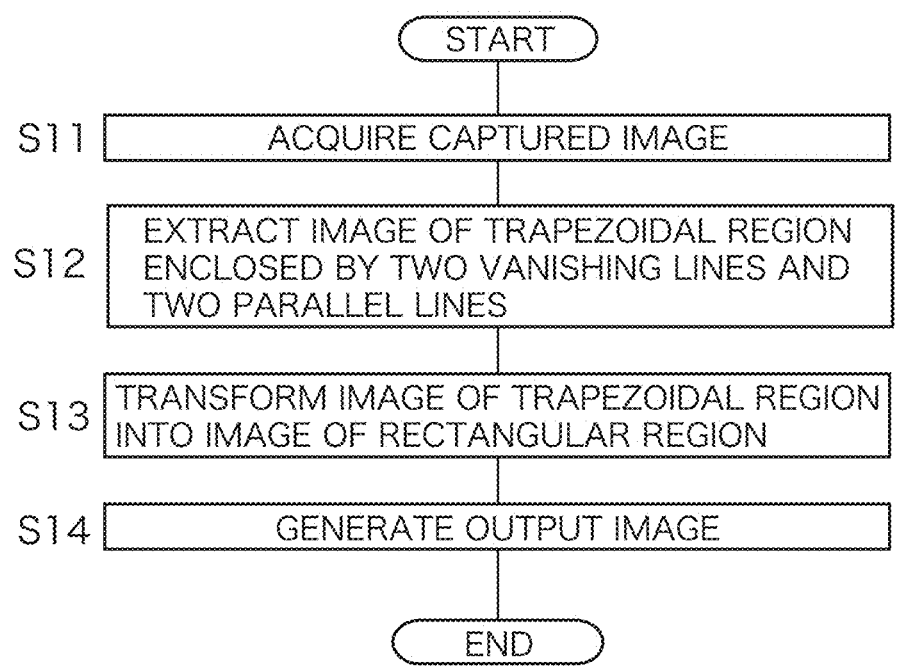
FIG. 4 is a flow chart for describing a procedure of processing executed by the image generating apparatus.
Figure 5:
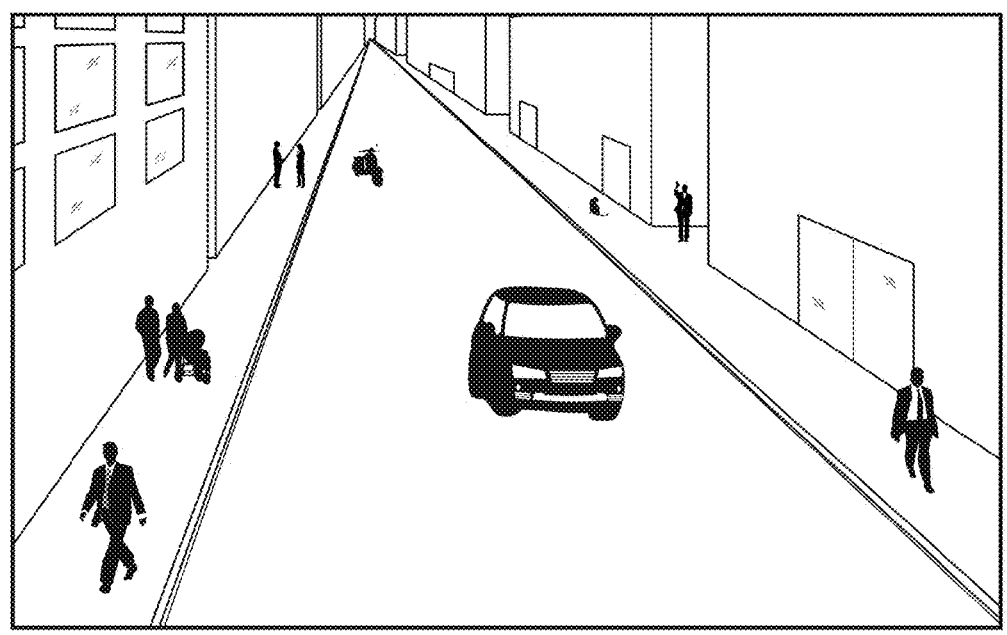
FIG. 5 is a schematic diagram illustrating an example of a captured image.

FIG. 4 is a flow chart describing a procedure of processing performed by the image generating apparatus 2. The control unit 21 of the image generating apparatus 2 acquires the captured image from the imaging apparatus 1 through the image input IF 23 (step S11). FIG. 5 is a schematic diagram illustrating one example of the captured image. In the captured image illustrated in FIG. 5, an image of a moving car is included in the near view part and an image of a motorcycle that is stationary is included in the distant view part.

Figure 6:
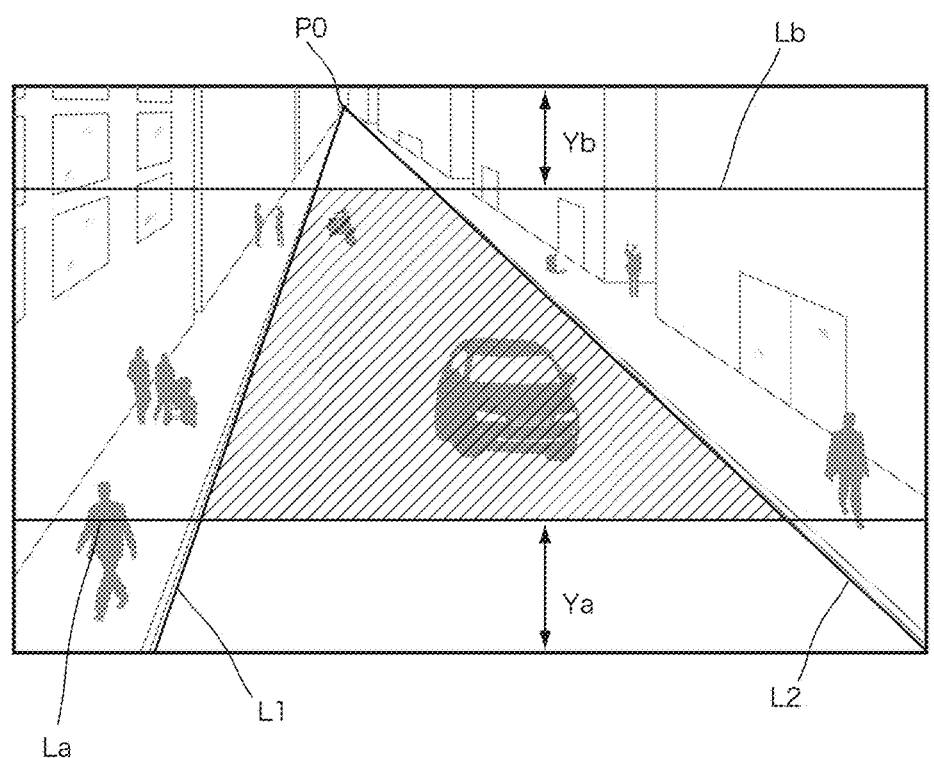
FIG. 6 is a diagram describing an extraction procedure.

Next, the control unit 21 extracts the image of the trapezoidal region enclosed by two vanishing lines and parallel lines from the captured image acquired (step S12). FIG. 6 is an explanatory diagram describing the extraction procedure. The control unit 21 extracts edges of curb portions of the road, buildings, windows, doors, or the like from the captured image, and obtains coordinates of a vanishing point P0 in which an extension line of the extracted edges is converged to the distant view part of the captured image. In the present embodiment, the example in which the vanishing point P0 is included in the captured image has been illustrated, but it is not necessary for the vanishing point P0 to be included in the captured image.

Then, the control unit 21 selects two edges representing the curb of the road, among the edges (or the extension lines of the edges) converged to the vanishing point P0, thus to set two vanishing lines L1 and L2. For example, the control unit 21 searches for each edge in a horizontal direction from a vertical line passing through the vanishing point P0 on the captured image, and selects an edge first searched in the horizontal direction, thus to set the two vanishing lines L1 and L2.

Next, the control unit 21 sets two parallel lines La and Lb corresponding to a lower side and an upper side of the trapezoidal region to be extracted. For example, the control unit 21 disposes the parallel line on the near view part at the position spaced apart from the lower side of the captured image by as much as the Ya pixel and disposed the parallel line on the distant view part at the position spaced apart from the upper side thereof by as much as the Yb pixel, thus to set the two parallel lines La and Lb.

Figure 7:
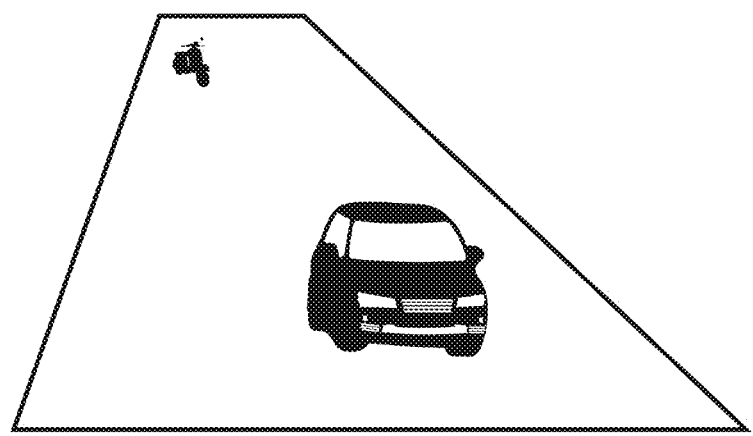
FIG. 7 is a schematic diagram illustrating an extracted image of a trapezoidal region.

Thereafter, the control unit 21 extracts the image of the trapezoidal region enclosed by the two vanishing lines L1 and L2 and the two parallel lines La and Lb from the captured image. FIG. 7 is a schematic diagram illustrating the extracted image of the trapezoidal region.

Further, in the present embodiment, it is configured to calculate the coordinates of the vanishing point P0 and obtain the extension line of the edges converged to the vanishing point P0, from the captured image, thus to set the two vanishing lines L1 and L2, but, if the imaging apparatus 1 images the road from the fixed position and posture, it is not necessary to obtain the vanishing point P0 and the extension line of the edges converged to the vanishing point P0, each time when the captured image is acquired. In this case, the vanishing lines L1 and L2 and the parallel lines La and Lb corresponding to respective sides of the trapezoidal region to be extracted may be previously set. When the captured image is acquired, the control unit 21 extracts the image of the trapezoidal region based on the two vanishing lines L1 and L2 and parallel lines La and Lb that are previously set.

Figure 8:
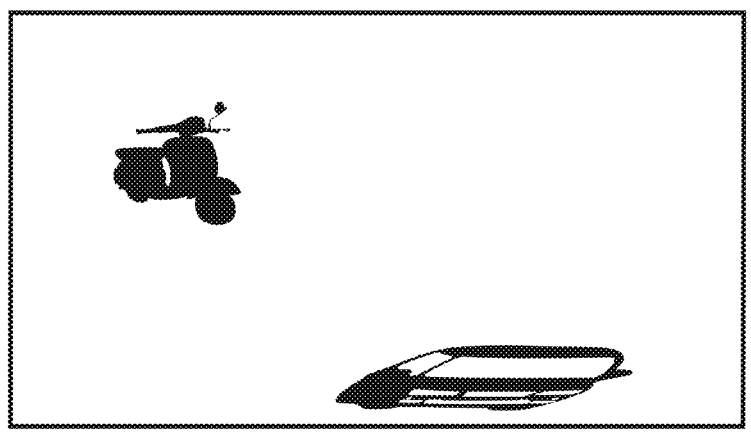
FIG. 8 is a schematic diagram illustrating an image of a rectangular region after transformation.

Next, the control unit 21 transforms the extracted image of the trapezoidal region into the image of the rectangular region (step S13). For example, by setting a geometric transformation model which transforms the trapezoidal region into the previously set rectangular region, and transforming the image of the trapezoidal region extracted in step S12 according to the geometric transformation model, the image of the rectangular region is acquired. Herein, the geometric transformation model is represented by the projective transformation that defines the geometrical relationship between the four vertices in the trapezoidal region of the transformation source and the four vertices in the rectangular region of the transformation destination. The control unit 21 transforms, by using the projective transformation matrix, coordinates x and y of each pixel forming the image of the trapezoidal region into coordinates X and Y of each pixel forming the image of the rectangular region of the transformation destination, thus to generate the image of the rectangular region. Of course, interpolation processing of a pixel value may be performed on the pixels after the transformation, according to the coordinate transformation of the pixels. FIG. 8 is a schematic diagram illustrating the image of the rectangular region after the transformation.

Next, the control unit 21 generates the output image based on the output image of the rectangular region after the transformation (step S14), and outputs the generated image to a prescribed output destination through the image output IF 24. The control unit 21 may output the image of the rectangular region transformed at step S13 as the output image, and may output an image in which linear transformation processing such as rotation, zooming, mirroring transformation, skew transformation, or the like is executed on the image of the rectangular region as the output image.

Figure 9A:
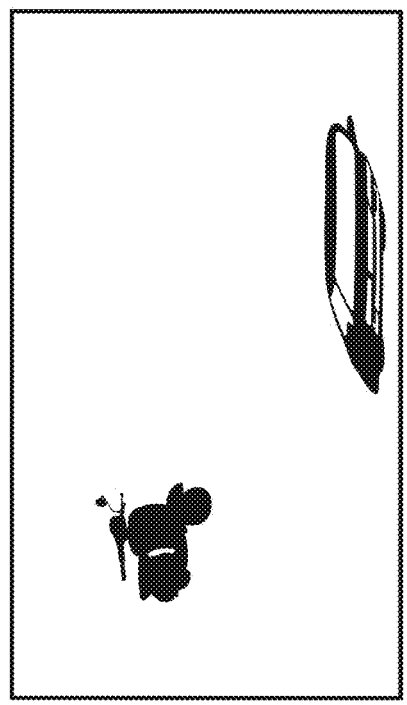
FIGS. 9A and 9B are a schematic diagram illustrating an example of an image in which linear transformation processing is executed on the image of the rectangular region.
Figure 9B:
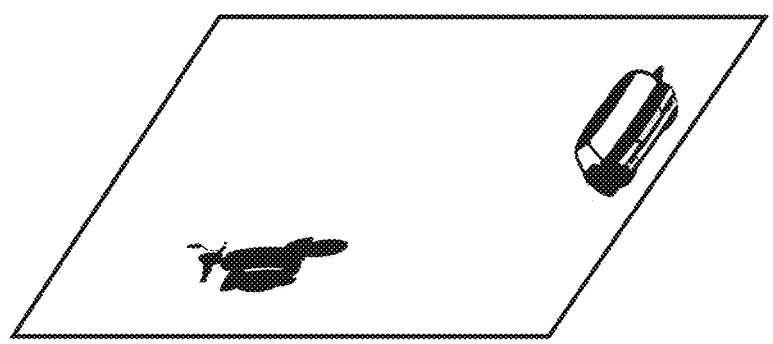

FIGS. 9A and 9B are a schematic diagram illustrating one example of an image in which the linear transformation processing is executed on the image of the rectangular region. FIG. 9A illustrates the output image generated by rotating the image of the rectangular region by 90° counterclockwise. In the original captured image, since the motorcycle on the distant view part is imaged in a small size, it is not easy for the supervisor and the user to recognize the presence of the motorcycle, and therefore an oversight may occur. On the other hand, in the output image illustrated in FIG. 9A, the image of the car on the near view part is distorted, but the image on the distant view part is enlarged, such that the presence of the motorcycle on the distant view part may be easily recognized.

FIG. 9B illustrates the output image generated by performing the rotation, a longitudinal reduction, and the skew transformation on the image of the rectangular region. By performing the above-described linear transformation processing, the image generating apparatus 2 may enlarge the image on the distant view part while suppressing a distortion of the image on the near view part.

As described above, the image generating apparatus 2 according to Embodiment 1 performs the deformation processing such as the projective transformation or the linear transformation on the image of the trapezoidal region extracted from the captured image, thus to generate an image obtained by enlarging the distant view part. Thereby, the road monitoring system according to Embodiment 1 displays the output image generated by the image generating apparatus 2 on the display apparatus 3, such that the image that may allow for easy recognition of the presence of a moving body and a structure within a monitoring region from the near view part to the distant view part may be provided to the supervisor and the user.

Further, according to the present embodiment, the projective transformation processing that transforms the image of the trapezoidal region into the image of the rectangular region, and the linear transformation processing that generates the output image from the image of the rectangular region have been described separately for the convenience of explanation, but it may be configured to perform these processings as a single process.

Further, in the present embodiment, it is configured to acquire the captured image of the road using the imaging apparatus 1 installed on the road, but it may be configured to acquire the captured image of the road using car mounted cameras that are mounted in vehicles such as a car. In this case, it may be configured that each vehicle includes the image generating apparatus 2 mounted therein, and displays the output image generated by the image generating apparatus 2 on an in-vehicle monitor.

Embodiment 2

In Embodiment 2, a configuration, in which the extracted image of the trapezoidal region is divided in the depth direction, and the divided images of the trapezoidal region are transformed into images of each rectangular region, and then are combine, will be described.

Further, the configuration of the road monitoring system, the configuration of the image generating apparatus 2, and the like according to Embodiment 2 are the same as those of Embodiment 1, and therefore will not be described.

Figure 10:
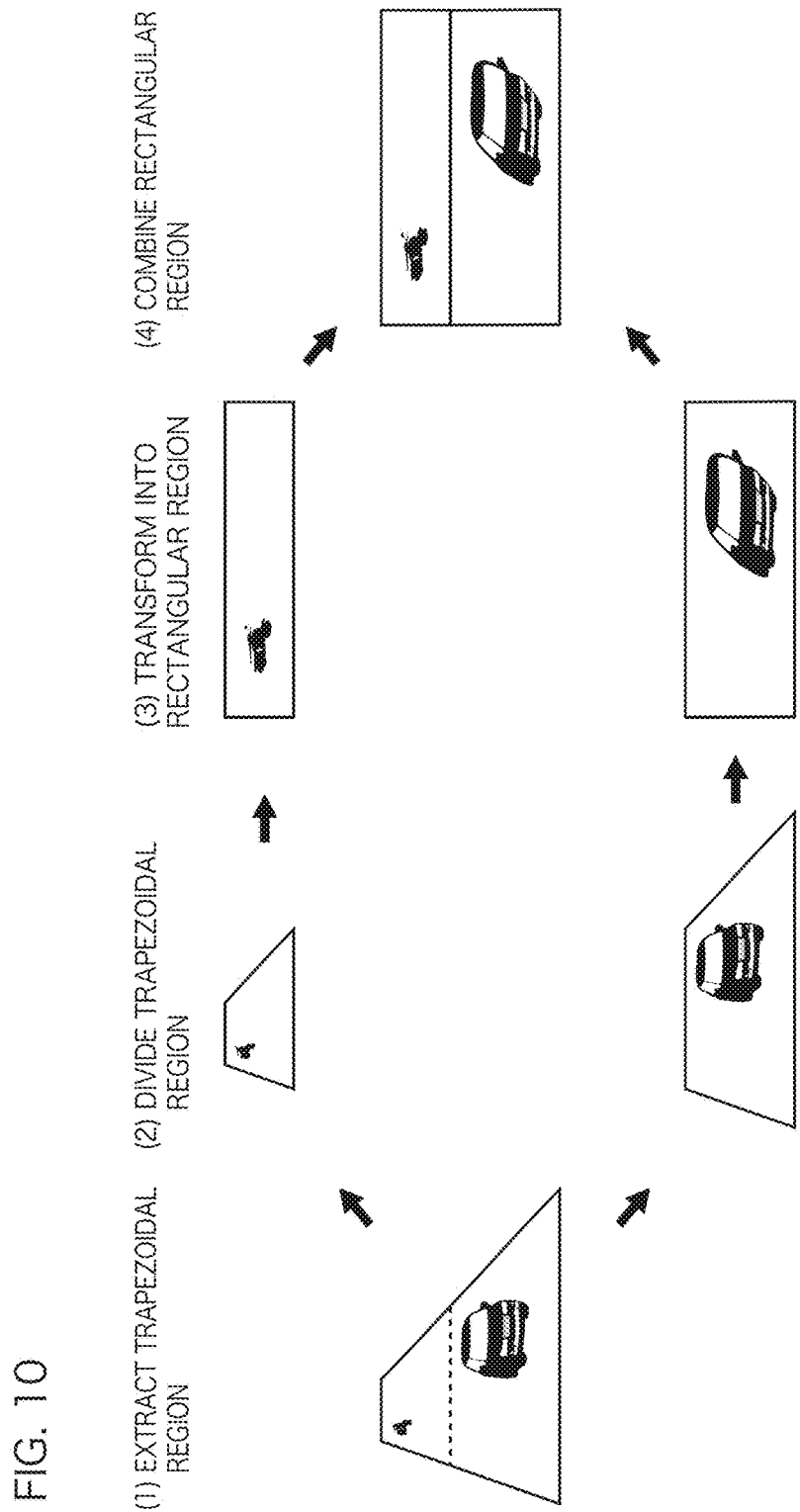
FIG. 10 is an explanatory diagram describing a processed content performed by an image generating apparatus according to Embodiment 2.

FIG. 10 is an explanatory diagram describing a processing content performed by the image generating apparatus 2 according to Embodiment 2. The control unit 21 of the image generating apparatus 2 performs the processing of the above-described steps S11 and S12, thus to extract the image of the trapezoidal region including a monitoring object from the captured image.

Next, the control unit 21 divides the extracted image of the trapezoidal region in the depth direction. The number of divisions and the divided place may be appropriately set. FIG. 10 illustrates an example in which the extracted image of the trapezoidal region is divided into two images around a center.

Next, the control unit 21 transforms each of the divided images of the trapezoidal region into the images of the rectangular region. Similar to Embodiment 1, by setting the geometric transformation model which transforms each of the trapezoidal regions into the rectangular region, and transforming the images of each trapezoidal region depending on the respective geometric transformation model, thereby the images of the trapezoidal region may be transformed into the images of the rectangular region.

Next, the control unit 21 combines the images of the rectangular region obtained by transforming the images of respective trapezoidal regions. The control unit 21 generates the output image based on the image after the combination, and outputs the output image to a prescribed output destination through the image output IF 24. In this case, similar to Embodiment 1, it may be configured to perform the linear transformation processing such as the rotation, zooming, mirroring transformation, skew transformation, or the like on the image after the combination, and generate the output image.

As described above, in Embodiment 2, the images of the trapezoidal region extracted from the captured image are divided in the depth direction, and the respective divided images are transformed into the images of the rectangular region, such that it is possible to suppress the image on the near view part from being distorted due to the projective transformation, and enlarge the image on the distant view part to an appropriate size. As a result, the road monitoring system according to the present embodiment may provide an image in which the moving body and the structure on the road are liable to be recognized to the monitor and the user.

Embodiment 3

In Embodiments 1 and 2, it is configured to generate the output image based on one captured image acquired from the imaging apparatus 1, but it may be configuration to dispose a plurality of imaging apparatuses 1 along a road, and generate one output image based on the captured images acquired from the imaging apparatuses.

In Embodiment 3, a configuration of generating one output image from a plurality of captured images will be described.

FIG. 11 is a block diagram illustrating a configuration of a road monitoring system according to Embodiment 3. The road monitoring system according to the present embodiment includes imaging apparatuses 1A, 1B and 1C which are installed along, for example, the road, and respectively images the road from the oblique above, the image generating apparatus 2 which generates images representing conditions of the road based on the captured images output from the imaging apparatuses 1A, 1B and 1C, and the display apparatus 3 which displays the image output from the image generating apparatus 2.

The imaging apparatuses 1A, 1B and 1C image the road at an appropriate timing. The imaging apparatuses 1A, 1B and 1C are connected to the image generating apparatus 2 through the communication line, and transmit the captured images obtained by imaging to the image generating apparatus 2.

The image generating apparatus 2 generates the image representing the conditions of the road based on the captured images acquired from the imaging apparatuses 1A, 1B and 1C. In this case, the image generating apparatus 2 extracts the images of the trapezoidal region to be monitored from each of the captured images, generates images obtained by enlarging the distant view part by transforming the extracted images of the trapezoidal region into the images of the rectangular region, and combines the generated images of the rectangular region, thus to generate the output images. The image generating apparatus 2 outputs the generated output image to the display apparatus 3.

Further, the internal configuration of the image generating apparatus 2 is the same as that of Embodiment 1, and therefore will not be described.

The display apparatus 3 displays the image output from the image generating apparatus 2, thus to provide information relating to the conditions of the road to the supervisor and the user.

FIG. 12 is an explanatory diagram describing a processing content performed by the image generating apparatus 2 according to Embodiment 3. The control unit 21 of the image generating apparatus 2 acquires the captured images obtained by imaging from the imaging apparatuses 1A, 1B and 1C through the image input IF 23. The control unit 21 extracts the images of the trapezoidal region from each of the captured images, and performs the projective transformation on the extracted images of the trapezoidal region, thus to generate the images of the rectangular region.

Further, it is not necessary for the images of the trapezoidal region extracted from the captured images by the control unit 21 to be the same shape as each other between the imaging apparatuses 1A, 1B and 1C, and the image having the shape set according to the installation positions and the postures of the imaging apparatuses 1A, 1B and 1C may be extracted.

Furthermore, the control unit 21 sets the geometric transformation model which transforms the image of the trapezoidal region into the image of the rectangular region for each of the imaging apparatuses 1A, 1B and 1C, and transforms the images of each trapezoidal region depending on the respective geometric transformation model, thereby the images of the trapezoidal region transformed into the images of the rectangular region.

Next, the control unit 21 combines the transformed images of the rectangular region to generate the output images. In this case, it may be configured to execute the linear transformation processing of the rotation, zooming, mirroring transformation, skew transformation, or the like on the images of each rectangular region, and then perform the image combination, thus to generate the output image. Further, it is preferable that the control unit 21 combines the images of the rectangular region in consideration of the arrangement relationship between the imaging apparatuses 1A, 1B and 1C. The information relating to the arrangement relationship between the imaging apparatuses 1A, 1B and 1C may be previously stored in the storage unit 22. The control unit 21 acquires the information relating to the arrangement relationship between the imaging apparatuses 1A, 1B and 1C from the storage unit 22, and combines the images of the rectangular region based on the acquired information relating to the disposition relationship. For example, when the imaging apparatuses 1A, 1B and 1C are arranged in this order, the images of the rectangular region generated from the imaging apparatuses 1A, 1B and 1C are combined in this order. Further, when the imaging apparatuses 1A, 1B and 1C are respectively arranged at a right, left, and a front of the road, the images of each rectangular region are arranged at a right, a left, and a lower side of a display screen in the display apparatus 3 and combined.

As described above, the image generating apparatus 2 according to Embodiment 3 extracts the images of the trapezoidal region for each of the captured images acquired from the plurality of imaging apparatuses 1A, 1B and 1C, performs the projective transformation and the linear transformation on the extracted images, and combines the images after the transformation to generate the output images. Therefore, the road monitoring system according to the present embodiment displays the output image generated by the image generating apparatus 2 on the display apparatus 3, such that the presence of the moving body and the structure may be easily recognized, and an image with little dead zone may be provided to the supervisor and the user.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims It is noted that, as used herein and in the appended claims, the singular forms "a", "an", and "the" include plural referents unless the context clearly dictates otherwise.

The invention claimed is:

1. An image generating apparatus comprising:
an image input interface configured to acquire a captured image of a road; and
a processor configured to:
extract an image of a trapezoidal region from the captured image, the trapezoidal region is enclosed by two vanishing lines which are converged to a vanishing point in a depth direction of the captured image and two parallel lines which respectively intersect with the two vanishing lines;
transform the image of the trapezoidal region into an image of a rectangular region using a geometric transformation model which transforms the trapezoidal region into the rectangular region; and
generate an image for enlarging and displaying a moving body or a structure on the road present at a distant view part of the captured image based on the transformed image having the rectangular region.

2. The image generating apparatus according to claim 1, wherein the geometric transformation model is represented by projective transformation that defines a geometrical relationship between four vertices of the trapezoidal region and four vertices of the rectangular region.

3. The image generating apparatus according to claim 1, wherein the processor is configured to rotate the image of the rectangular region.

4. The image generating apparatus according to claim 1, wherein the processor is configured to:
divide the image of the trapezoidal region in the depth direction to provide divided regions; and
combine a plurality of images of the rectangular region obtained by respectively transforming the images of respective divided regions.

5. The image generating apparatus according to claim 1, wherein a plurality of captured images are acquired by imaging different ranges of the road, and
the processor is configured to combine the plurality of images of the rectangular region obtained by transforming the images of the trapezoidal regions extracted from the captured images respectively.

6. The image generating apparatus according to claim 5, wherein the processor is configured to acquire information relating to an arrangement of respective imaging apparatuses which take images of the road, and
the plurality of images of the rectangular region are combined based on the acquired information relating to the arrangement of the respective imaging apparatuses.

7. An image generating method which includes acquiring a captured image of a road, and generating an image representing conditions of the road based on the captured image by a computer, comprising:
extracting an image of a trapezoidal region from the captured image, the trapezoidal region is enclosed by two vanishing lines which are converged to a vanishing point in a depth direction of the captured image and two parallel lines which respectively intersect with the two vanishing lines by the computer;
transforming the image of the trapezoidal region into an image of a rectangular region using a geometric transformation model which transforms the trapezoidal region into the rectangular region by the computer; and
generating an image for enlarging and displaying a moving body or a structure on the road present at a distant view part of the captured image based on the transformed image having the rectangular region by the computer.

8. A non-transitory computer readable medium storing a computer program which is executed by a computer for generating an image representing conditions on a road based on a captured image of the road, the computer program comprising:
causing the computer to extract an image of a trapezoidal region from the captured image, the trapezoidal region is enclosed by two vanishing lines which are converged to a vanishing point in a depth direction of the captured image and two parallel lines which respectively intersect with the two vanishing lines by the computer; and
causing the computer to transform the image of the trapezoidal region into an image of a rectangular region using a geometric transformation model which transforms the trapezoidal region into the rectangular region by the computer.

* * * * *